United States Patent
Chen et al.

(10) Patent No.: US 12,223,299 B2
(45) Date of Patent: Feb. 11, 2025

(54) RESOURCE CONSTRAINT AWARE DEEP LEARNING MODEL OPTIMIZATION FOR SERVERLESS-BASED INFERENCE SYSTEMS

(71) Applicant: Red Hat, Inc., Raleigh, NC (US)

(72) Inventors: Huamin Chen, Westboro, MA (US); Jinjun Xiong, Goldens Bridge, NY (US); Roland Ludwig Huss, Pegnitz (DE)

(73) Assignee: Red Hat, Inc., Raleigh, NC (US)

( * ) Notice: Subject to any disclaimer, the term of this patent is extended or adjusted under 35 U.S.C. 154(b) by 1049 days.

(21) Appl. No.: 17/161,568

(22) Filed: Jan. 28, 2021

(65) Prior Publication Data

US 2022/0237448 A1    Jul. 28, 2022

(51) Int. Cl.
*G06F 8/41* (2018.01)
*G06F 9/455* (2018.01)
*G06N 3/04* (2023.01)

(52) U.S. Cl.
CPC ............ *G06F 8/443* (2013.01); *G06F 8/4434* (2013.01); *G06F 8/4441* (2013.01); *G06F 9/45558* (2013.01); *G06N 3/04* (2013.01)

(58) Field of Classification Search
CPC ...... G06F 8/443; G06F 8/4434; G06F 8/4441; G06F 9/45558; G06N 3/04
USPC ................................................. 717/151–157
See application file for complete search history.

(56) References Cited

U.S. PATENT DOCUMENTS

| | | | | |
|---|---|---|---|---|
| 10,915,382 B2 * | 2/2021 | Zhang | .................. | G06F 9/4881 |
| 11,018,965 B1 * | 5/2021 | Ibryam | .................. | H04L 67/101 |
| 11,281,635 B2 * | 3/2022 | Natanzon | .............. | G06F 3/0608 |
| 11,327,814 B2 * | 5/2022 | Floes | .................. | G06F 16/2255 |
| 11,422,844 B1 * | 8/2022 | Filiz | .................... | G06F 9/45558 |

OTHER PUBLICATIONS

Alex Ellis, "Get storage for your Serverless Functions with Minio & Docker", 2018, retrieved from https://blog.alexellis.io/openfaas-storage-for-your-functions/ , 21 pages. (Year: 2018).*
Mujkanovic et al., "Optimising AI Training Deployments using Graph Compilers and Containers", 2020, arXiv, 8 pages. (Year: 2020).*
Taibi et al., "Patterns for Serverless Functions (Function-as-a-Service): a Multivocal Literature Review", 2020, Scitepress, pp. 181-192. (Year: 2020).*
"Machine Learning Lens", Amazon Web Services, Inc., Apr. 2020.
(Continued)

*Primary Examiner* — Ted T. Vo
(74) *Attorney, Agent, or Firm* — Womble Bond Dickinson (US) LLP (57) ABSTRACT

A method includes detecting, by a webhook controller, an inference serverless function invocation. The method further includes determining that the inference serverless function can be optimized. The method further includes generating an optimized version of the inference serverless function using a graph compiler, in response to the determining. The method further includes replacing, by a processing device of the webhook controller, a storage volume in an init container of the inference serverless function with a new storage volume comprising the optimized version of the inference serverless function.

20 Claims, 6 Drawing Sheets

(56) References Cited

OTHER PUBLICATIONS

Daisuke Hamuro et al., "Carrier Cloud for Deep Learning to Enable High Efficient Inference Processing—R&D Technologies as a Source of Competitive Power in Company Activities", Jan. 2020, NTT Technical Review, vol. 18, No. 1.

Ahsan Ali et al., "Batch: Machine Learning Inference Serving on Serverless Platforms with Adaptive Batching", Nov. 2020, IEEE Press.

* cited by examiner

RESOURCE CONSTRAINT AWARE DEEP LEARNING MODEL OPTIMIZATION FOR SERVERLESS-BASED INFERENCE SYSTEMS

TECHNICAL FIELD

Aspects of the present disclosure relate to serverless functions, and more specifically, to resource constraint aware deep learning model optimization for serverless-based inference systems.

BACKGROUND

In computing, a server is a piece of computer hardware or software (computer program) that provides functionality for other programs or devices, called "clients." This architecture is called the client-server model. Servers can provide various functionalities, often called "services," such as sharing data or resources among multiple clients, or performing computation for a client. A single server can serve multiple clients, and a single client can use multiple servers. A client process may run on the same device or may connect over a network to a server on a different device.

A serverless function is a programmatic function written by a software developer for a single purpose. It is then hosted and maintained on infrastructure by cloud computing companies. These companies take care of infrastructure maintenance and function execution so that developers can deploy new code faster and easier.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

In one embodiment, a resource constraint aware deep learning model optimization for serverless-based inference systems is described herein. As described herein, a server may be a piece of computer hardware or software (computer program) that provides functionality for other programs or devices, called "clients." This architecture is called the client-server model. Servers can provide various functionalities, often called "services," such as sharing data or resources among multiple clients, or performing computation for a client. In one embodiment, servers may be classified according to "roles" (e.g., primary functionalities or responsibilities of the servers). Examples of server roles may include, but are not limited to, database servers, file servers, mail servers, print servers, web servers, game servers, and application servers.

In one embodiment, serverless computing is a cloud computing execution model in which the cloud provider allocates machine resources on demand, taking care of the servers on behalf of their customers. Serverless computing does not permanently hold resources in volatile memory; computing is rather done in short bursts with the results persisted to storage. When an app is not in use, there are no computing resources allocated to the app. Pricing may be based on the actual amount of resources consumed by an application. In one embodiment, serverless computing can be a form of utility computing. In some sense, "serverless" may be a misnomer because servers are still used by cloud service providers to execute code for developers. However, developers of serverless applications may not be concerned with capacity planning, configuration, management, maintenance, operating or scaling of containers, VMs, or physical servers.

Serverless computing can simplify the process of deploying code into production. Serverless code can be used in conjunction with code deployed in traditional styles, such as microservices or monoliths. Alternatively, applications can be written to be purely serverless and do not require persistently provisioned servers at all.

A serverless function may be a programmatic function written by a software developer for a single purpose. It is then hosted and maintained on infrastructure by cloud computing companies. These companies take care of infrastructure maintenance and function execution so that developers can deploy new code faster and easier.

With respect to artificial intelligence and machine learning, serverless systems have a variety of advantages and disadvantages. For example, one problem with respect to machine learning inference serverless systems is that deep learning models are getting more and more complicated, causing significant performance degradation on resource constrained environments such as serverless functions.

In one embodiment, machine learning model-optimization-as-a-service may be practiced both by large public clouds, as well as by smaller organizations. One problem with this model-optimization-as-a-service is that the deep neural network (DNN) models have to be uploaded to either a third party (e.g., in the Octoml.ai case) or a separate Cloud service (e.g., in the AWS case). Problematically, neither option allows the model owners to control what can be done on the models. Furthermore, as DNN models are highly prized business assets, so leaking and tampering with DNN models leads to loss of confidentiality as well as privacy for the model owners. Additionally, serverless computing, as it exists today, may not be suited to some computing workloads, such as inference functions, because of the resource limits imposed by cloud providers, and also because it would likely be cheaper to bulk-provision the number of servers believed to be required at any given point in time.

In response to the problems described above, and others, resource constraint aware deep learning model optimization for serverless-based inference systems are described herein. Advantageously, the embodiments of the present disclosure overcome the above and other challenges by ensuring that model optimization preserves the privacy and intellectual property of the model owners. The protocols described herein solve the problems of safeguarding Intellectual property and privacy by ensuring that machine learning models do not go out of the computing and storage scope of the model owners.

This is accomplished due to the fact that the embodiments described herein allow for model optimization without the current need to upload such models to a third party or separate cloud service. Advantageously, by using a webhook to detect serverless function invocations and, in response, providing all of the information necessary for optimization (e.g., resource claims, limits, cost models, etc.) to an invoked graph compiler or other optimizer, upload of the machine learning model itself to a third party service or separate cloud service is no longer necessary. As such, sensitive information of the machine learning models need not be unnecessarily transmitted to, and/or stored by, organizations other than those that have rights to the corresponding intellectual property. As a result, the protocols described herein substantially mitigate the chance that such intellectual property can be accessed by unauthorized parties.

Furthermore, the protocols described herein allow for the use of serverless environments in a more secure manner than was previously possible. Advantageously, such use allows developers both the privacy and security of more traditional methods, and optimizes resource management to more efficiently leverage dynamic resources of serverless systems. In the embodiments described herein, such benefits are accomplished via a new protocol to optimize deep learning models using any graph compilers (or DNN optimizers) and to inject such dynamically optimized deep learning models in a serverless environment.

Notably, the embodiments described herein may use KFServing, based on Knative, as an example, but the concepts can be applied to any generic serverless computing systems and methods. In one embodiment, KFServing enables serverless inferencing on the Kubernetes platform (an open-source container orchestration system for automating deployment, scaling, and management of containerized applications) with containers as its underlying infrastructure. It abstracts different ML frameworks such as TensorFlow, PyTorch, and XGBoost. It supports auto scaling, scale to zero, canary rollouts, GPUs, and more.

Figure 1A:
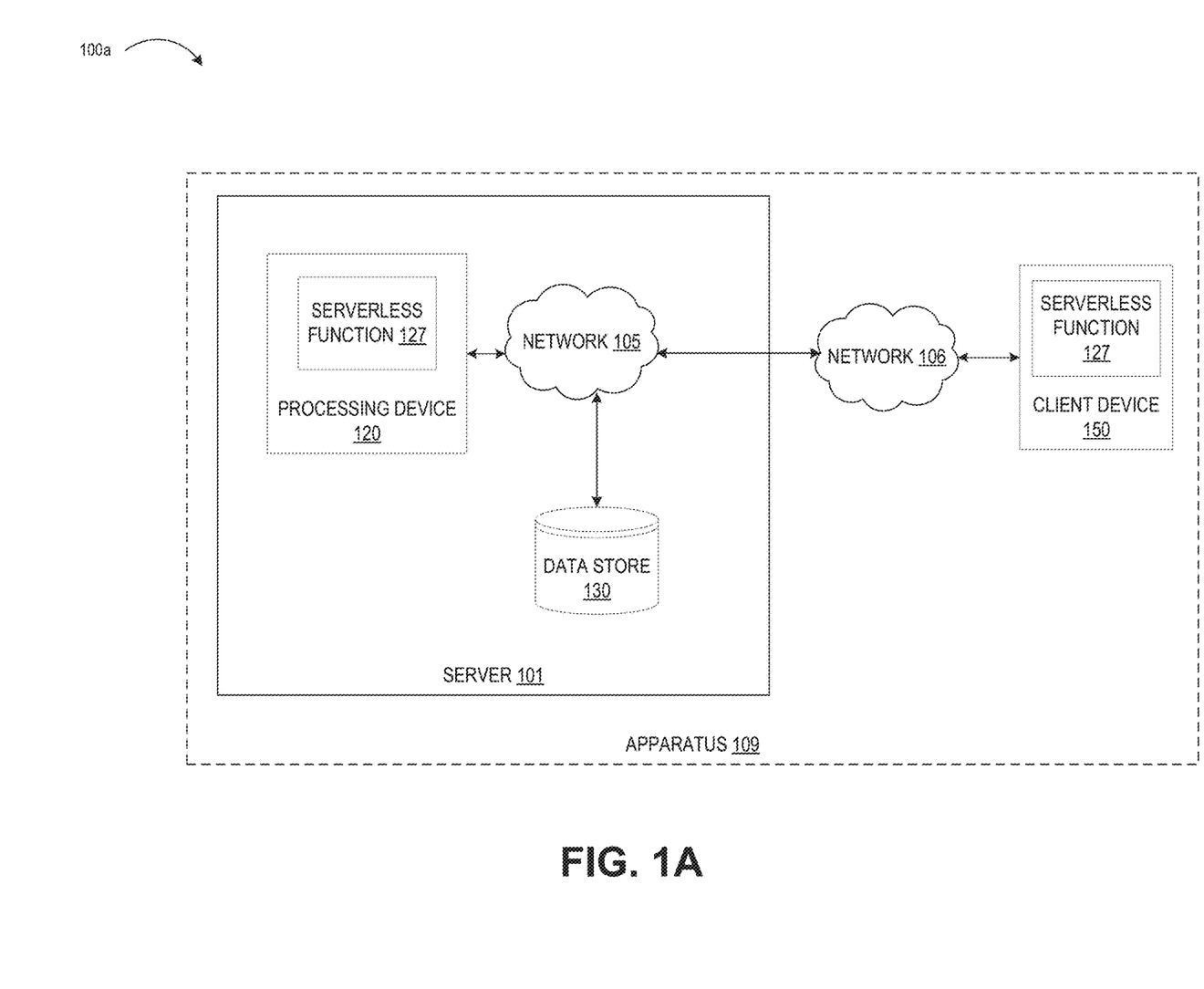
FIG. 1A is a block diagram that illustrates a first example system, in accordance with some embodiments of the present disclosure.

FIG. 1A is a block diagram that illustrates a first example system 100a, in accordance with some embodiments of the present disclosure. As discussed herein, serverless function 127 may include logic that enables the operations and systems described herein, when executed. In one embodiment, system 100a may be described as an apparatus 109, including means for performing the operations described herein (e.g., server 101, network 106, client device 150, etc.). In one embodiment, serverless function (e.g., an inference serverless function invocation) 127 resides or operates in whole or in part on a server (e.g., server 101) of system 100a. In another embodiment, serverless function 127 resides in whole or in part on a client device (e.g., client device 150) of system 100a. In yet another embodiment, serverless function 127 resides in whole or in part on any combination of the two, or in a different system entirely.

Server 101 may include various components, which may allow serverless function 127 to run on a server device or client device. Each component may perform different functions, operations, actions, processes, methods, etc., for the embodiments described herein and/or may provide different services, functionalities, and/or resources for the embodiments described herein.

As illustrated in FIG. 1A, server 101 includes a serverless function 127, a computing processing device 120, a data store 130, and a network 105. The serverless function 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include serverless function 127, in addition to, or alternatively from, server 101. Further implementation details of the operations performed by system 101*a* are described with respect to FIGS. 1B-4.

Figure 1B:
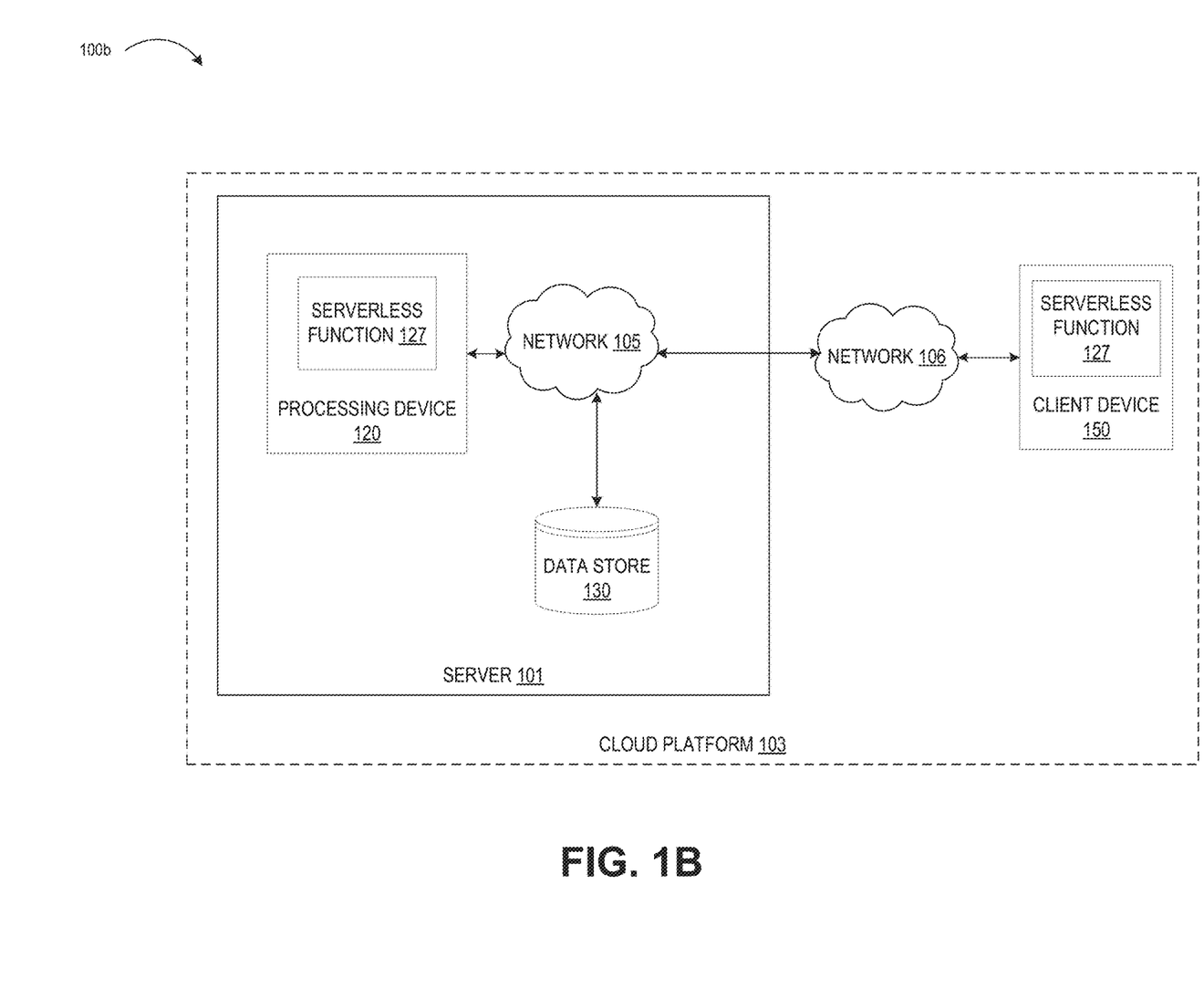
FIG. 1B is a block diagram that illustrates a second example system, in accordance with some embodiments of the present disclosure.

FIG. 1B is a block diagram that illustrates a second example system 100*b*, in accordance with some embodiments of the present disclosure. System 100*b* includes a cloud platform 103, which may include one or more components. As discussed herein, serverless function 127 may include logic that enables the operations and systems described herein, when executed. In one embodiment, system 100*b* may be described as a cloud platform 103, including means for performing the operations described herein (e.g., server 101, network 106, client device 150, etc.). In one embodiment, serverless function 127 resides in whole or in part on a server (e.g., server 101) of system 100*b*. In another embodiment, serverless function 127 resides in whole or in part on a client device (e.g., client device 150) of system 100*b*. In yet another embodiment, serverless function 127 resides in whole or in part on any combination of the two, or in a different system entirely.

Server 101 may include various components, which may allow serverless function 127 to run on a server device or client device. Each component may perform different functions, operations, actions, processes, methods, etc., for the embodiments described herein and/or may provide different services, functionalities, and/or resources for the embodiments described herein.

As illustrated in FIG. 1B, server 101 includes a serverless function 127, a computing processing device 120, a data store 130, and a network 105. The serverless function 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include serverless function 127, in addition to, or alternatively from, server 101. Further implementation details of the operations performed by systems 101*b* are described with respect to FIGS. 1A and 1C-4.

Figure 1C:
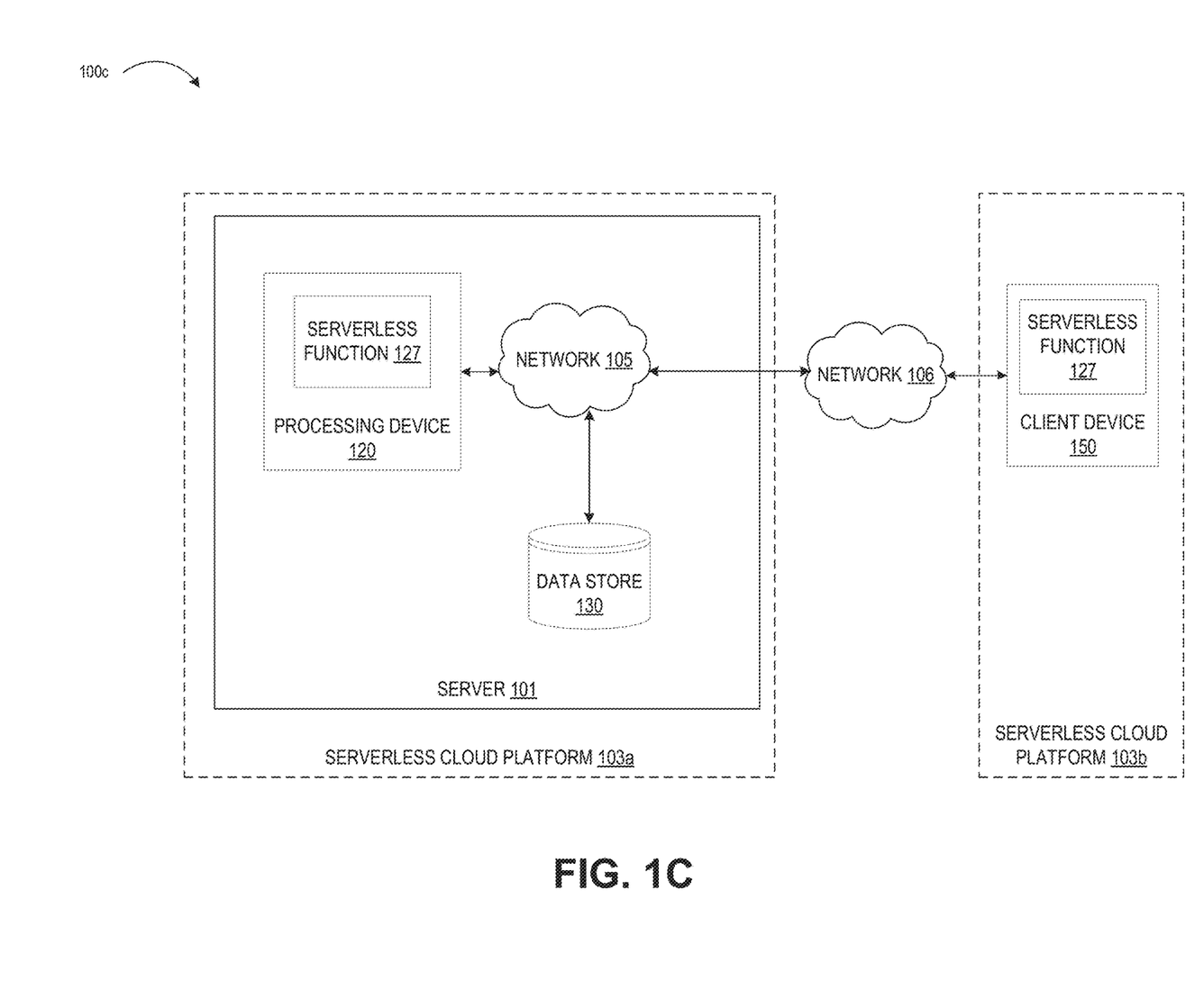
FIG. 1C is a block diagram that illustrates a third example system, in accordance with some embodiments of the present disclosure.

FIG. 1C is a block diagram that illustrates a third example system 100*c*, in accordance with some embodiments of the present disclosure. System 100*b* includes one or more serverless cloud platforms 103*a* and 103*b*, which may include one or more components. As discussed herein, serverless function 127 may include logic that enables the operations and systems described herein, when executed. In one embodiment, system 100*c* may be described as a serverless cloud platforms 103*a* and/or 103*b*, including means for performing the operations described herein (e.g., server 101, network 106, client device 150, etc.). In one embodiment, serverless function 127 resides in whole or in part on a server (e.g., server 101) of system 100*c*. In another embodiment, serverless function 127 resides in whole or in part on a client device (e.g., client device 150) of system 100*c*. In yet another embodiment, serverless function 127 resides in whole or in part on any combination of the two, or in a different system entirely.

Server 101 may include various components, which may allow serverless function 127 to run on a server device or client device. Each component may perform different functions, operations, actions, processes, methods, etc., for the embodiments described herein and/or may provide different services, functionalities, and/or resources for the embodiments described herein.

As illustrated in FIG. 1C, server 101 includes a serverless function 127, a computing processing device 120, a data store 130, and a network 105. The serverless function 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101 and/or between a variety of serverless cloud platforms (e.g., 103a and 103b). The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include serverless function 127, in addition to, or alternatively from, server 101. Further implementation details of the operations performed by system 101c are described with respect to FIGS. 1A-B and 2-4.

Figure 2:
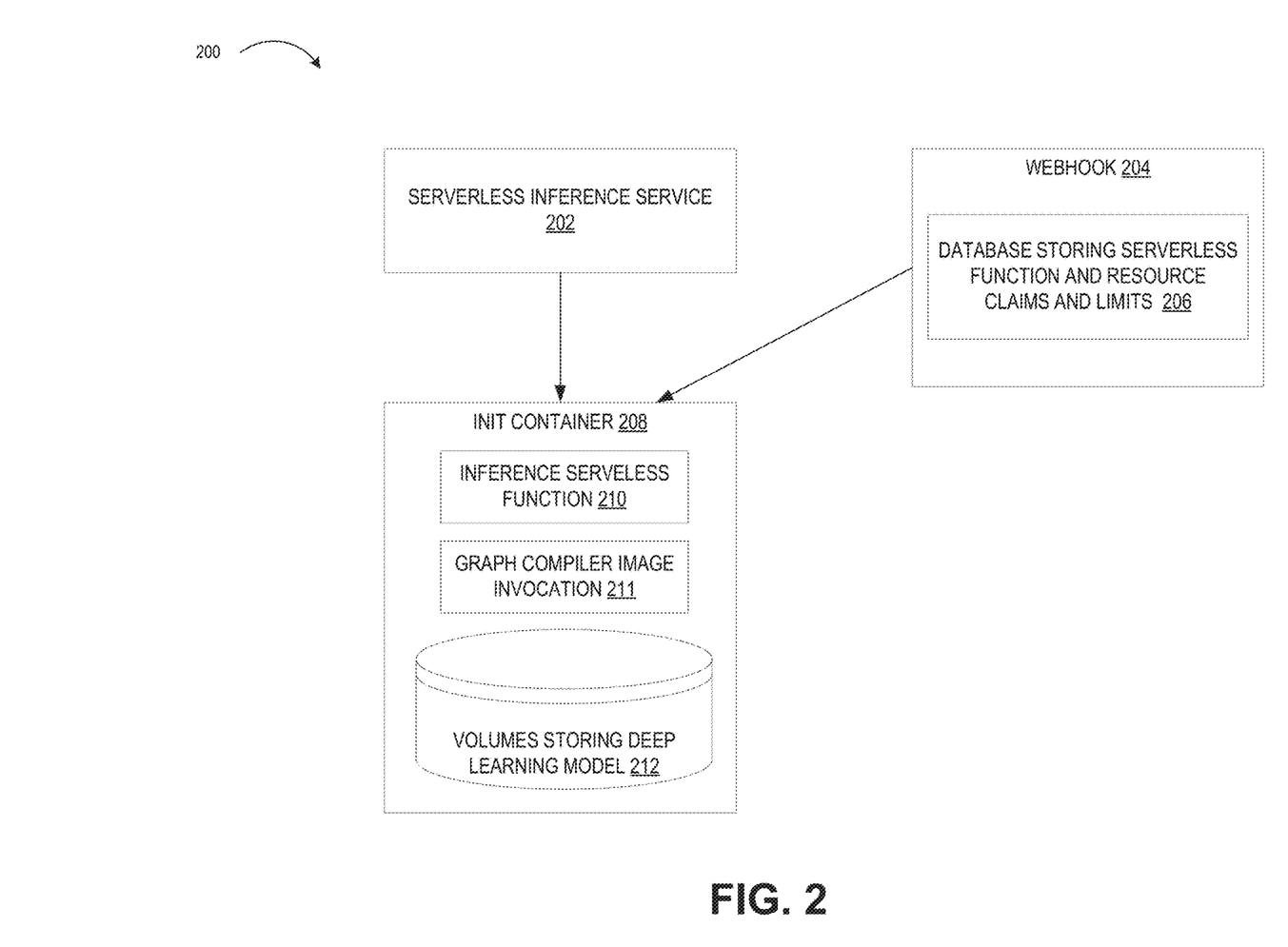
FIG. 2 is a block diagram that illustrates a fourth example system, in accordance with some embodiments of the present disclosure.

FIG. 2 is a block diagram that illustrates a fourth example system, in accordance with some embodiments of the present disclosure. In one embodiment of the protocol described herein, a webhook controller (e.g., of webhook 204) watches for a serverless function invocation (e.g., by serverless inference service 202). When an inference serverless function 210 is invoked, the Webhook 204 checks the database 206 to see if the serverless function is being invoked for the first time, or if the resource claim and limit have changed since a last check, or if the volume for a machine learning model (e.g., a DNN model) has changed since a last check. If the webhook 204 determines that the answer to any of the prior questions is true, the webhook 204 generates or adds an init Container 208 that may perform any of the following operations:
 Invokes the graph compiler image (211).
 Fetches the volume (e.g., 212) of the deep learning model used by the inference serverless function 210 and passes the location to the graph compiler.
 Retrieves the resource claims and limits of the inference service serverless function (e.g., from database 206) and passes them as parameters to the graph compiler.
 When started, the graph compiler uses the resource claims and limits (206), and optimizes the deep learning model. The optimized model is then uploaded to the new volume (e.g., of volumes 212).
 Adds a new volume (e.g., to volumes 212) for the init container 208 to store the optimized model to the init container 208; the optimized model is then uploaded to the new volume (212); and replaces the prior volume (212) or saves a versioned copy of prior volume (212) used by the inference serverless function 210 for graph models.

Figure 3A:
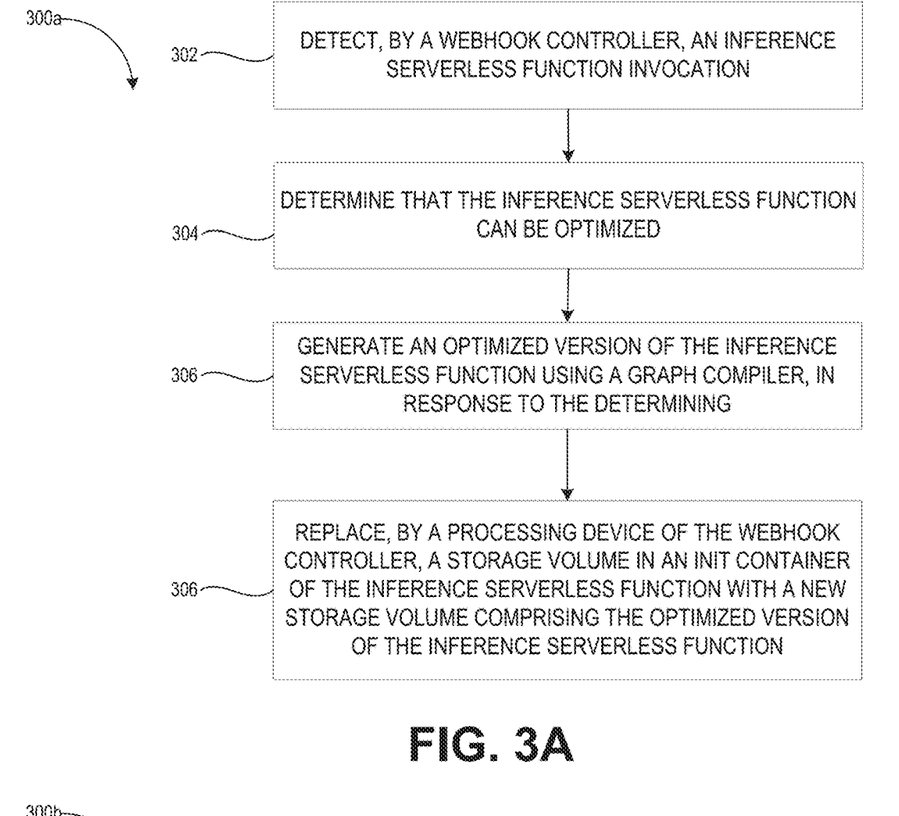
FIG. 3A is a first flow diagram of a resource constraint aware deep learning model optimization for serverless-based inference systems, in accordance with some embodiments of the present disclosure.

In one embodiment, the described protocol differs from existing embodiments in at least the following ways:
 Webhook 204 injects an init container 208 the first time the inference serverless function 210 starts, or when the resource claim and limit change (e.g., as references from database 206).
 Webhook 204 passes the inference serverless functions' (210) resource claim and/or limit (e.g., 206) to the graph compiler.
 Webhook 204 passes pre-configured cost models to the graph compiler
 Webhook 204 replaces the volume (e.g., in 212) or saves a versioned copy of prior volume (212) used by the inference serverless function 210 with a new one (also 212) that contains the optimized model generated by the graph compiler FIG. 3A is a first flow diagram 300a of a resource constraint aware deep learning model optimization for serverless-based inference systems, in accordance with some embodiments of the present disclosure. The method 300a may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIGS. 1A-C and FIG. 2 may perform one or more of the following operations. For example, in one embodiment, processing logic of processing device 120 performs the following operations, with respect to the individual components of FIGS. 1A-C and/or FIG. 2. In another embodiment, any other suitable processing device may perform the described operations.

Referring to FIG. 3A, at block 302, processing logic may detect, by a webhook controller, an inference serverless function invocation. In one embodiment, the webhook controller is constantly monitoring the serverless inference service for new invocations. In another embodiment, the serverless inference service notifies the webhook of such invocations.

At block 304, processing logic determine that the inference serverless function can be optimized. In one embodiment, to determine that the inference serverless function can be optimized, processing logic may perform a variety of analysis. For example, processing logic may determine that the inference serverless function is being invoked for a first time. In another embodiment, processing logic may alternatively or additionally determine that a resource claim or limit of the inference serverless function has been modified since a prior invocation of the inference serverless function. In another embodiment, processing logic may alternatively or additionally determine that a container volume associated with the inference serverless function has been modified since a prior invocation of the inference serverless function.

At block 306, processing logic may generate an optimized version of the inference serverless function using a graph compiler or a DNN optimizer, in response to the determining. In one embodiment, processing logic may determine that a resource claim or limit of the inference serverless function has been modified since a prior invocation of the inference serverless function and provide an updated resource claim or limit to the graph compiler for generating the optimized version of the inference serverless function. In another embodiment, processing logic may provide a preconfigured cost model associated with the inference serverless function to the graph compiler for generating the optimized version of the inference serverless function.

At block 308, processing logic may replace, by a processing device of the webhook controller, a storage volume in an init container of the inference serverless function with a new storage volume comprising the optimized version of the inference serverless function. Processing logic may further save a versioned copy of the volume. In one embodiment, processing logic may generate the new storage volume of the init container and store the optimized version of the inference serverless function in the new storage volume of the init container. In another embodiment, both storage volumes may continue to exist and processing logic may point the init container to the new storage volume. In yet another embodiment, the data of the existing storage volume may simply be overwritten with the new optimized version of the inference serverless function. In one embodiment, processing logic may optionally generate the init container for the inference serverless function in response to determining that the inference serverless function can be optimized. In another embodiment, an existing init container may be used.

Figure 3B:
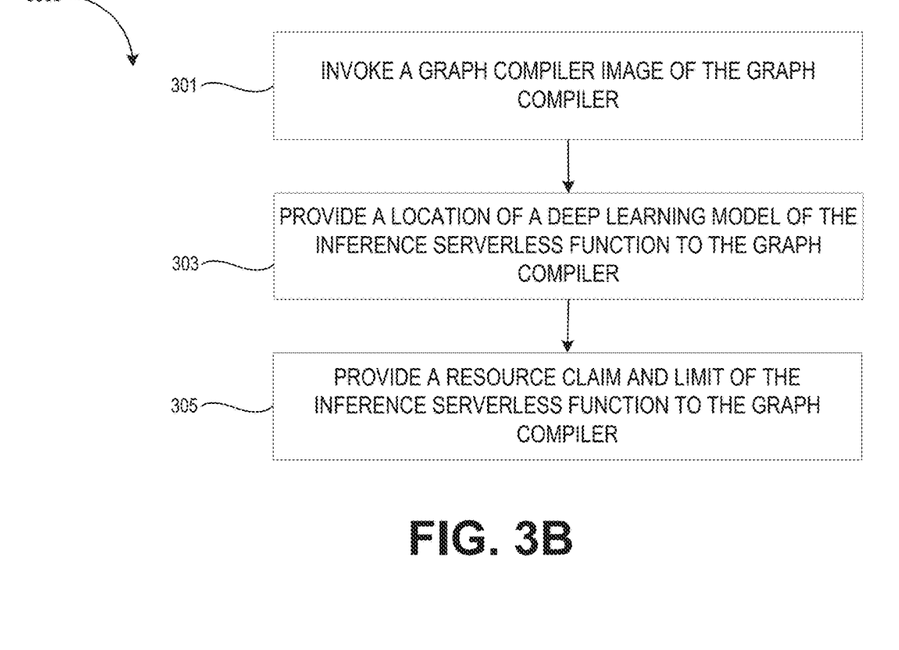
FIG. 3B is a second flow diagram of a resource constraint aware deep learning model optimization for serverless-based inference systems, in accordance with some embodiments of the present disclosure.

FIG. 3B is a second flow diagram 300b of a resource constraint aware deep learning model optimization for serverless-based inference systems, in accordance with some embodiments of the present disclosure. The method 300b may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIGS. 1A-C and FIG. 2 may perform one or more of the following operations. For example, in one embodiment, processing logic of processing device 120 performs the following operations, with respect to the individual components of FIGS. 1A-C and/or FIG. 2. In another embodiment, any other suitable processing device may perform the described operations.

Referring to FIG. 3B, at block 301, processing logic may invoke a graph compiler image of the graph compiler or DNN optimizer to perform an optimization of an inference serverless function. At block 303, processing logic may provide a location of a deep learning model (e.g., an existing, non-optimized version) of the inference serverless function to the graph compiler. At block 305, processing logic may provide a resource claim and/or limit of the inference serverless function to the graph compiler to perform the optimization, which optimization may be based on the provided resource claim and/or limit of the inference serverless function.

Figure 4:
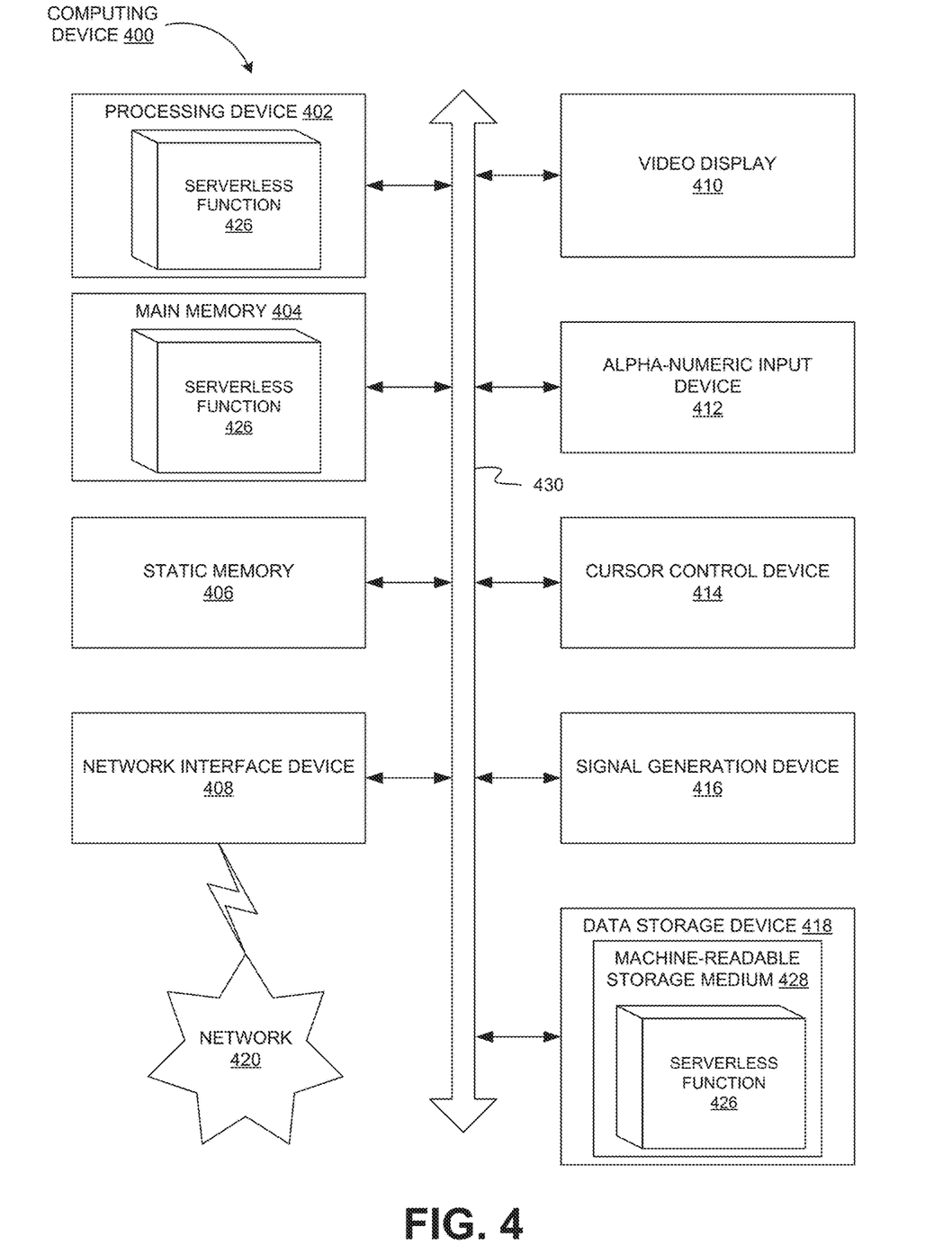
FIG. 4 is a block diagram of an example computing device that may perform one or more of the operations described herein, in accordance with some embodiments of the present disclosure.

FIG. 4 is a block diagram of an example computing device 400 that may perform one or more of the operations described herein, in accordance with some embodiments of the present disclosure. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein. In one embodiment, processing device 402 represents processing device 120 of FIG. 1A. In another embodiment, processing device 402 represents a processing device of a client device (e.g., client device 150 of FIG. 1A).

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions, e.g., instructions for carrying out the operations described herein, in accordance with one or more aspects of the present disclosure. Instructions implementing serverless function 426 may also reside, completely or at least partially, within main memory 404 and/or within processing device 402 during execution thereof by computing device 400, main memory 404 and processing device 402 also constituting computer-readable media. The instructions may further be transmitted or received over a network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method, comprising: detecting, by a webhook controller, an inference serverless function invocation; determining that the inference serverless function can be optimized; generating an optimized version of the inference serverless function using a graph compiler, in response to the determining; and replacing, by a processing device of the webhook controller, a storage volume in an init container of the inference serverless function with a new storage volume comprising the optimized version of the inference serverless function.

Example 2 is the method of Example 1, further comprising: invoking a graph compiler image of the graph compiler; providing a location of a deep learning model of the inference serverless function to the graph compiler; and providing a resource claim and limit of the inference serverless function to the graph compiler.

Example 3 is the method of Example 1, further comprising: generating the new storage volume of the init container; and storing the optimized version of the inference serverless function in the new storage volume of the init container.

Example 4 is the method of Example 1, further comprising: determining that a resource claim or limit of the inference serverless function has been modified since a prior invocation of the inference serverless function; and providing an updated resource claim or limit to the graph compiler for generating the optimized version of the inference serverless function.

Example 5 is the method of Example 1, further comprising providing a pre-configured cost model associated with the inference serverless function to the graph compiler for generating the optimized version of the inference serverless function.

Example 6 is the method of Example 1, wherein determining that the inference serverless function can be optimized comprises at least one of: determining that the inference serverless function is being invoked for a first time, determining that a resource claim or limit of the inference serverless function has been modified since a prior invocation of the inference serverless function, or determining that a container volume associated with the inference serverless function has been modified since a prior invocation of the inference serverless function.

Example 7 is the method of Example 1, further comprising generating the init container for the inference serverless function in response to determining that the inference serverless function can be optimized.

Example 8 is a system, comprising: a memory; and a processing device operatively coupled to the memory, the processing device to: detect, by a webhook controller, an inference serverless function invocation; generate an optimized version of the inference serverless function using a deep neural network optimizer; and replace a storage volume in an init container of the inference serverless function with a new storage volume comprising the optimized version of the inference serverless function.

Example 9 is the system of Example 8, the processing device further to: invoke a deep neural network optimizer image of the deep neural network optimizer; provide a location of a deep learning model of the inference serverless function to the deep neural network optimizer; and provide a resource claim and limit of the inference serverless function to the deep neural network optimizer.

Example 10 is the system of Example 8, the processing device further to: generate the new storage volume of the init container; and store the optimized version of the inference serverless function in the new storage volume of the init container.

Example 11 is the system of Example 8, the processing device further to: determine that a resource claim or limit of the inference serverless function has been modified since a prior invocation of the inference serverless function; and provide an updated resource claim or limit to the deep neural network optimizer for generating the optimized version of the inference serverless function.

Example 12 is the system of Example 8, the processing device further to provide a pre-configured cost model associated with the inference serverless function to the deep neural network optimizer for generating the optimized version of the inference serverless function.

Example 13 is the system of Example 8, wherein to determine that the inference serverless function can be optimized the processing device is further to: determine that the inference serverless function is being invoked for a first time, determine that a resource claim or limit of the inference serverless function has been modified since a prior invocation of the inference serverless function, or determine that a container volume associated with the inference serverless function has been modified since a prior invocation of the inference serverless function.

Example 14 is the system of Example 8, the processing device further to generate the init container for the inference serverless function in response to determining that the inference serverless function can be optimized.

Example 15 is a non-transitory computer-readable storage medium including instructions that, when executed by a processing device, cause the processing device to: detect, by a webhook controller, an inference serverless function invocation; determine that the inference serverless function can be optimized; generate an optimized version of the inference serverless function using a graph compiler, in response to the determination; and replace, by the processing device of the webhook controller, a storage volume in an init container of the inference serverless function with a new storage volume comprising the optimized version of the inference serverless function.

Example 16 is the non-transitory computer-readable storage medium of Example 15, the processing device further to: invoke a graph compiler image of the graph compiler; provide a location of a deep learning model of the inference serverless function to the graph compiler; provide a resource claim and limit of the inference serverless function to the graph compiler; generate the new storage volume of the init container; and store the optimized version of the inference serverless function in the new storage volume of the init container.

Example 17 is the non-transitory computer-readable storage medium of Example 15, the processing device further to: determine that a resource claim or limit of the inference serverless function has been modified since a prior invocation of the inference serverless function; and provide an updated resource claim or limit to the graph compiler for generating the optimized version of the inference serverless function.

Example 18 is the non-transitory computer-readable storage medium of Example 15, the processing device further to provide a pre-configured cost model associated with the inference serverless function to the graph compiler for generating the optimized version of the inference serverless function.

Example 19 is the non-transitory computer-readable storage medium of Example 15, wherein to determine that the inference serverless function can be optimized the processing device is further to: determine that the inference serverless function is being invoked for a first time, determine that a resource claim or limit of the inference serverless function has been modified since a prior invocation of the inference serverless function, or determine that a container volume associated with the inference serverless function has been modified since a prior invocation of the inference serverless function.

Example 20 is the non-transitory computer-readable storage medium of Example 15, the processing device further to generate the init container for the inference serverless function in response to determining that the inference serverless function can be optimized.

Example 21 is an apparatus, comprising: means for detecting, by a webhook controller, an inference serverless function invocation; means for determining that the inference serverless function can be optimized; means for generating an optimized version of the inference serverless function using a graph compiler, in response to the determining; and means for replacing, by a processing device of the webhook controller, a storage volume in an init container of the inference serverless function with a new storage volume comprising the optimized version of the inference serverless function.

Example 22 is the apparatus of Example 21, further comprising: means for invoking a graph compiler image of the graph compiler; means for providing a location of a deep learning model of the inference serverless function to the graph compiler; and means for providing a resource claim and limit of the inference serverless function to the graph compiler.

Example 23 is the apparatus of Example 21, further comprising: means for generating the new storage volume of the init container; and means for storing the optimized version of the inference serverless function in the new storage volume of the init container.

Example 24 is the apparatus of Example 21, further comprising: means for determining that a resource claim or limit of the inference serverless function has been modified since a prior invocation of the inference serverless function; and means for providing an updated resource claim or limit to the graph compiler for generating the optimized version of the inference serverless function.

Example 25 is the apparatus of Example 21, further comprising means for providing a pre-configured cost model associated with the inference serverless function to the graph compiler for generating the optimized version of the inference serverless function.

Example 26 is the apparatus of Example 21, wherein determining that the inference serverless function can be optimized comprises at least one of: means for determining that the inference serverless function is being invoked for a first time, means for determining that a resource claim or limit of the inference serverless function has been modified since a prior invocation of the inference serverless function, or means for determining that a container volume associated with the inference serverless function has been modified since a prior invocation of the inference serverless function.

Example 27 is the apparatus of Example 21, further comprising means for generating the init container for the inference serverless function in response to determining that the inference serverless function can be optimized.

Example 28 is a cloud platform, comprising: a memory; and a processing device operatively coupled to the memory, the processing device to: detect, by a webhook controller, an inference serverless function invocation; generate an optimized version of the inference serverless function using a graph compiler; and replace a storage volume in an init container of the inference serverless function with a new storage volume comprising the optimized version of the inference serverless function.

Example 29 is the cloud platform of Example 28, the processing device further to: invoke a graph compiler image of the graph compiler; provide a location of a deep learning model of the inference serverless function to the graph compiler; and provide a resource claim and limit of the inference serverless function to the graph compiler.

Example 30 is the cloud platform of Example 28, the processing device further to: generate the new storage volume of the init container; and store the optimized version of the inference serverless function in the new storage volume of the init container.

Example 31 is the cloud platform of Example 28, the processing device further to: determine that a resource claim or limit of the inference serverless function has been modified since a prior invocation of the inference serverless function; and provide an updated resource claim or limit to the graph compiler for generating the optimized version of the inference serverless function.

Example 32 is the cloud platform of Example 28, the processing device further to provide a pre-configured cost model associated with the inference serverless function to the graph compiler for generating the optimized version of the inference serverless function.

Example 33 is the cloud platform of Example 28, wherein to determine that the inference serverless function can be optimized the processing device is further to: determine that the inference serverless function is being invoked for a first time, determine that a resource claim or limit of the inference serverless function has been modified since a prior invocation of the inference serverless function, or determine that a container volume associated with the inference serverless function has been modified since a prior invocation of the inference serverless function.

Example 34 is the cloud platform of Example 28, the processing device further to generate the init container for the inference serverless function in response to determining that the inference serverless function can be optimized.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    detecting, by a webhook controller, an inference serverless function invocation;
    determining that the inference serverless function can be optimized;
    generating an optimized version of the inference serverless function using a graph compiler, in response to the determining; and
    replacing, by a processing device of the webhook controller, a storage volume in an init container of the inference serverless function with a new storage volume comprising the optimized version of the inference serverless function.

2. The method of claim 1, further comprising:
    invoking a graph compiler image of the graph compiler;
    providing a location of a deep learning model of the inference serverless function to the graph compiler; and
    providing a resource claim and limit of the inference serverless function to the graph compiler.

3. The method of claim 1, further comprising:
    generating the new storage volume of the init container; and
    storing the optimized version of the inference serverless function in the new storage volume of the init container.

4. The method of claim 1, further comprising:
    determining that a resource claim or limit of the inference serverless function has been modified since a prior invocation of the inference serverless function; and
    providing an updated resource claim or limit to the graph compiler for generating the optimized version of the inference serverless function.

5. The method of claim 1, further comprising providing a pre-configured cost model associated with the inference serverless function to the graph compiler for generating the optimized version of the inference serverless function.

6. The method of claim 1, wherein determining that the inference serverless function can be optimized comprises at least one of:
   determining that the inference serverless function is being invoked for a first time,
   determining that a resource claim or limit of the inference serverless function has been modified since a prior invocation of the inference serverless function, or
   determining that a container volume associated with the inference serverless function has been modified since a prior invocation of the inference serverless function.

7. The method of claim 1, further comprising generating the init container for the inference serverless function in response to determining that the inference serverless function can be optimized.

8. A system, comprising:
   a memory; and
   a processing device operatively coupled to the memory, the processing device to:
      detect, by a webhook controller, an inference serverless function invocation;
      generate an optimized version of the inference serverless function using a deep neural network optimizer; and
      replace a storage volume in an init container of the inference serverless function with a new storage volume comprising the optimized version of the inference serverless function.

9. The system of claim 8, the processing device further to:
   invoke a deep neural network optimizer image of the deep neural network optimizer;
   provide a location of a deep learning model of the inference serverless function to the deep neural network optimizer; and
   provide a resource claim and limit of the inference serverless function to the deep neural network optimizer.

10. The system of claim 8, the processing device further to:
    generate the new storage volume of the init container; and
    store the optimized version of the inference serverless function in the new storage volume of the init container.

11. The system of claim 8, the processing device further to:
    determine that a resource claim or limit of the inference serverless function has been modified since a prior invocation of the inference serverless function; and
    provide an updated resource claim or limit to the deep neural network optimizer for generating the optimized version of the inference serverless function.

12. The system of claim 8, the processing device further to provide a pre-configured cost model associated with the inference serverless function to the deep neural network optimizer for generating the optimized version of the inference serverless function.

13. The system of claim 8, wherein to determine that the inference serverless function can be optimized the processing device is further to:
    determine that the inference serverless function is being invoked for a first time,
    determine that a resource claim or limit of the inference serverless function has been modified since a prior invocation of the inference serverless function, or
    determine that a container volume associated with the inference serverless function has been modified since a prior invocation of the inference serverless function.

14. The system of claim 8, the processing device further to generate the init container for the inference serverless function in response to determining that the inference serverless function can be optimized.

15. A non-transitory computer-readable storage medium including instructions that, when executed by a processing device, cause the processing device to:
    detect, by a webhook controller, an inference serverless function invocation;
    determine that the inference serverless function can be optimized;
    generate an optimized version of the inference serverless function using a graph compiler, in response to the determination; and
    replace, by the processing device of the webhook controller, a storage volume in an init container of the inference serverless function with a new storage volume comprising the optimized version of the inference serverless function.

16. The non-transitory computer-readable storage medium of claim 15, the processing device further to:
    invoke a graph compiler image of the graph compiler;
    provide a location of a deep learning model of the inference serverless function to the graph compiler;
    provide a resource claim and limit of the inference serverless function to the graph compiler;
    generate the new storage volume of the init container; and
    store the optimized version of the inference serverless function in the new storage volume of the init container.

17. The non-transitory computer-readable storage medium of claim 15, the processing device further to:
    determine that a resource claim or limit of the inference serverless function has been modified since a prior invocation of the inference serverless function; and
    provide an updated resource claim or limit to the graph compiler for generating the optimized version of the inference serverless function.

18. The non-transitory computer-readable storage medium of claim 15, the processing device further to provide a pre-configured cost model associated with the inference serverless function to the graph compiler for generating the optimized version of the inference serverless function.

19. The non-transitory computer-readable storage medium of claim 15, wherein to determine that the inference serverless function can be optimized the processing device is further to:
    determine that the inference serverless function is being invoked for a first time,
    determine that a resource claim or limit of the inference serverless function has been modified since a prior invocation of the inference serverless function, or
    determine that a container volume associated with the inference serverless function has been modified since a prior invocation of the inference serverless function.

20. The non-transitory computer-readable storage medium of claim 15, the processing device further to generate the init container for the inference serverless function in response to determining that the inference serverless function can be optimized.

* * * * *